UNITED STATES PATENT OFFICE 2,466,046

PREPARATION OF CLAY CATALYSTS

Hubert A. Shabaker, Media, and George Alexander Mills, Ridley Park, Pa., and Ruth C. Denison, Wilmington, Del., assignors to Houdry Process Corporation, Wilmington, Del., a corporation of Delaware No Drawing. Application January 30, 1946, Serial No. 644,421

7 Claims. (Cl. 252—450)

The present invention relates to argillaceous contact masses and is particularly concerned with products having new and improved properties especially important in contact catalysis, and methods for the preparation of the same.

It has heretofore been proposed to employ as contact masses in catalytic conversion of hydrocarbons certain natural earths and clays. Very few of such materials that have been tried in cracking, reforming or related reactions have been found appropriate for the purpose, since in many instances catalysts formed therefrom were found to be substantially inert, or had a tendency to promote excessive deposition of coky substance which is not only undesirable on its own account, but such deposit also effects rapid decline in catalytic activity, necessitating frequent regeneration after comparatively short periods of operation.

The value of a contact material as a catalyst in the processes referred to is dependent upon its capability of selectively forming from the charge stock optimum quantities of desired liquid hydrocarbons such as products useful as motor fuel, with a minimum production of gas and coke. For instance a contact material which is relatively inert catalytically, such as diatomaceous earth or kieselguhr, when attempted to be used in a cracking operation, yields products varying but little in quality and quantity from those obtained by thermal cracking in the absence of such contact material. On the other hand, there are contact materials of natural or synthetic origin which have the property of forming from petroleum hydrocarbon fractions large quantities of carbon and low molecular weight gases including hydrocarbon gases, at the expense of desired liquid fractions. Such contact materials likewise are not ordinarily useful or desirable as cracking or reforming catalysts.

Among the natural adsorptive materials which are either substantially inert or otherwise impractical as hydrocarbon conversion catalysts, because they produce large quantities of coke and/or gas compared to the gasoline yield there are some clays, including certain sub-bentonites, which can be activated by acid treatment to produce catalysts of acceptable quality. Many available clays, however, do not respond to the usual methods of activation, such as by acid to produce catalysts of sufficiently high selectivity and activity level and are therefore regarded as unsuitable for commercial use as cracking or reforming catalysts. As illustrative of the latter category there come into consideration many clays of the montmorillonite family that are regarded as non-activatable by acid such as the swelling bentonites, and a wide variety of clays of most common occurrence and extensive distribution including china clays, ball clays and kaolins.

The present invention has among its objects the provision of novel methods of activation whereby inactive clays become available for the preparation of active catalysts and whereby catalytically active or acid activatable clays are improved in useful properties.

Naturally occurring clays are composed chiefly of hydrosilicates of aluminum but ordinarily contain besides the principal compounds and complexes of silica and alumina lesser proportions of compounds of iron, calcium, magnesium, etc. Some clays also include among their lesser components, compounds of zirconium or titanium. In the selection of natural adsorptive materials for use as catalysts it has previously been observed in U. S. Patent 2,078,945 of Eugene J. Houdry, that the content of iron compounds has a critical relation to the capacity of the contact mass for regeneration without extensive loss in catalytic activity. The patent indicates that contact masses suitable for use as catalysts should not contain over 3% of iron oxide.

Although a large part of the iron compounds occurring in or as components of many clays are present in such form that they can be largely removed therefrom as for instance by conventional acid treatment, such procedures result, as in the prior art activatable bentonite-type clays employed as catalysts, in products still containing in the order of about 1.5% or more of iron determined as ferric oxide. Acid treatment also removes portions of the aluminum content of the clay, so that if the clay residue is to be used for purposes where aluminum content is an important consideration, as for catalyst manufacture, the extent of the treatment must accordingly be limited. Thus, on repeated or more drastic treatments, additional quantities of iron compounds may be removed but the products so obtained become increasingly impaired in physical properties and because of accompanying extraction of comparatively large quantities of aluminum compounds, the treatment provokes a marked decline in catalytic activity; eventually resulting in products of such reduced catalytic activity that they are no longer useful for that purpose. Although it is not desired to be bound by any scientific explanation, there is reason to believe that the less readily removable iron components of clays are present in a different form from that of the more easily extractable iron components, being intimately associated in a complex with silicon or perhaps forming a part of the lattice structure by addition to or as proxy for other principal cations of the pattern. This form of iron component may be broadly designated as "isomorphous," although it is recognized that the clay structure may not necessarily be crystalline and that portions or all of the more tenaciously held iron components may vary in form from that of the principal component of the clay structure.

In accordance with the present invention clay masses are subjected to a treatment including contact at high temperature with a gas or vapor of selected characteristics. By the treatment, the properties of the clay are modified and the iron compounds present in the clay including that portion which is more tenaciously held and is not readily and selectively extracted by acid treatment are converted to acid soluble form, for example, acid soluble salts, the gas or vapor being selected so as to provide a component capable of chemically combining with iron to form an iron salt. The iron components of the clay which are present as silicon complexes or otherwise intimately associated with the lattice structure as in isomorphous form, as above explained, are released by their transformation to reaction products which can be readily removed by mild acid treatment and/or washing or in some instances by volatilization. The residual mass acquires certain new and distinct properties of particular importance when the clay so prepared is utilized, as a catalyst in hydrocarbon conversion, as will hereinafter appear. By the herein proposed treatment, natural clays of the types heretofore not regarded as appropriate cracking catalysts are made valuable for such use and catalytically active clays considerably improved in useful properties.

The new catalysts obtained are characterized by important differences in physical properties that cannot be attributed entirely to the reduced iron content and accordingly certain structural changes are believed to have taken place as a result of the high temperature gas or vapor treatment of the clay. For instance, the new products do not materially shrink at calcination temperatures of 1600° F., withstand higher temperatures than usual clay catalysts without substantial depreciation in catalytic activity, and demonstrate a distinguishing X-ray pattern. Besides, the new catalysts are generally lighter or whiter in color than the clays from which they are prepared and notable differences in spectrogram are also observed. Catalysts prepared from clays treated in accordance with the present invention obtain not only unexpectedly low initial coke makes on heavy and sulfur stocks, but demonstrate a surprising resistance to "abnormal aging" and deterioration by highly corrosive charge stocks, on continued use; the weight ratios of gasoline/coke and gasoline/gas on lighter charge stocks may be substantially improved. The present catalysts are capable of withstanding more severe conditions and higher regeneration temperatures in practical operation which considered together with a longer indicated "useful life" of the catalyst and significantly improved yields of desired cracked products constitute important economic advantages in addition to that afforded consequent to the use of readily available and inexpensive raw materials. Moreover, it is now made possible to operate more efficiently and economically with sulfur-containing and other corrosive stocks which rapidly deteriorate ordinary clay catalysts.

As the iron content of the clay is reduced in accordance with the present invention the catalyst prepared therefrom is progressively improved in properties and the important advantages indicated above become emphasized by the structural modifications which are thought to take place coincidentally with or as a result of the freeing of the isomorphous iron. The various steps of the process, however, should be controlled to minimize accompanying removal of alumina, particularly in clays having a comparatively low original content of alumina. More marked improvement in catalytic properties of the clay catalysts with progressive iron removal appears generally when the content of iron calculated as $Fe_2O_3$ by weight on clay product (dry basis) is reduced to about 0.4% $Fe_2O_3$, although catalysts of still lower iron content are preferred as those having less than about 0.3% $Fe_2O_3$ and for corrosive stocks particularly, best results are obtained with catalysts having a content of iron compounds corresponding to less than 0.2% $Fe_2O_3$.

Since the high temperature treatment with gas or vapor destroys the plasticity of the clay, it is important that the same be treated substantially in the form in which it is to be employed as a catalyst. If the clay were initially treated in finely divided form, it would not possess sufficient cohesiveness to be readily amenable to the formation of larger aggregate masses such as by extrusion or molding, nor would the clay form a cohesive cake that could be broken up into pieces of desired size without crumbling.

The aforesaid treatment with the gas or vapor at elevated temperature may be preceded and is preferably followed by a wet treatment with mineral acid or an organic acid which forms soluble iron salts or complexes, including lower aliphatic carboxylic acids such as oxalic and acetic as well as hydroxy acids including lactic and the so-called sugar acids. Where the acid treatment precedes, the more available iron compounds (f. i., outside of the lattice structure) are converted to soluble iron salts which are removed as in the known acid activation of bentonites and the residual iron component (f. i., chemically combined in the lattice) thereafter can be acted upon with greater facility by the gaseous treating agents. Acid treatment following the dry gaseous treatment is effective in assisting the removal of products formed by the reaction of the gaseous agents with the complex or otherwise less available residual iron components. It will be readily understood, therefore, that it may be desirable to employ an acid treatment both before and after the gas or vapor treatment at elevated temperature.

In the production of a catalyst from a clay of the montmorillonite group such as an acid activatable bentonite, the initial acid pretreatment is particularly advantageous, since the otherwise poor porosity of the clay impedes penetration by the gaseous or vapor treating agent. Generally with kaolin type clays acid pretreatment is less significant although with some types of kaolin clays a mild acid pretreatment will also be found beneficial. The preliminary acid treatment may be effected by known processes such as are employed in the art for "acid activation" in the manufacture of decolorizing clays. For instance, the acid treatment may be carried out on the clay in finely divided form while the clay is suspended in water as in the nature of a slurry, to which a concentrated acid such as hydrochloric or sulfuric is added, or dilute acid may be added directly to the finely divided clay. The acid pretreatment, particularly in th case of kaolin clays need not be as severe as usually employed in activation of bentonites, which usually requires in the order of about 30% to 40% acid to dry clay. It is preferred to heat the mixture of clay and acid to about 160° to 210° F. for a period of two to twelve hours, followed by water washing and filtering. If desired, the clay may at this point be washed free of acid ions with accompanying extraction of substantially all soluble metal salts. The acid treated clay with or without purification by washing may then be dried in any known or desired manner. A milder acid pretreatment than that described above will be sufficient to open pores in the clay, allowing easy access of the gas or vapor used in the process described herein.

The untreated clay or preferably the above described acid treated clay or a commercially obtainable acid-treated clay, preferably after being formed into aggregate masses of desired size as for instance by granulating, molding, extruding or the like (as is practiced in forming of clay catalysts) is subjected to the gas or vapor treatment at a temperature preferably in the range of from about 1200° F. up to about the temperature which would result in rapid shrinkage or substantial incipient fusion of the clay. Since clays will vary in composition and properties including fusion temperature even when obtained from the same source, exact temperature ranges cannot be set out. It has been observed that with montmorillonite types of clay the maximum temperature may be as high as 1500° and at times 1550° F., whereas in the case of kaolin clays, for instance, even higher temperatures may be employed as above 1600° to 1650° F. The quantity of gas or vapor employed should be at least sufficient to chemically combine with the quantity of iron present in the clap but is advantageously employed in excess.

As above indicated, the vapor or gas employed is one which reacts chemically with the iron components initially present in the clay or remaining therein after the preliminary acid treatment, if practiced, including that portion of the iron intimately associated in the lattice structure or otherwise in so-called "isomorphous" form. The reagents employed, moreover, act selectively on the iron content without affecting substantial quantities of the aluminum or silicon components of the product, as to an extent which would impair the activity of the clay product as a catalyst. Where the gaseous treating agent converts the iron components of the clay to compounds vaporizable at the treating temperature no further treatment to remove the iron would be required. This would be the case for instance in a treatment with chlorine gas at 1200° to 1400° F. wherein the iron would be vaporized in the form of ferric chloride. In other instances, however, such as where the chlorine treatment is at lower temperatures or the reactive gas or vapor does not form volatile compounds, the iron compounds are nevertheless converted by the treatment to a more available and more readily removable form, such as iron salts, which can then be removed from the treated clay by washing with water or a solvent for the iron salts, or by treatment with a dilute acid, with or without alternate water washing. For example, the clay may be treated with $H_2S$ at 1400° F. and then washed with dilute hydrochloric acid. Instead of leaching out the converted iron compounds, formed by the gas or vapor treatment, they might alternatively be removed by further treatment with another gas or vapor such as chlorine to volatilize the same. Even in instances where subsequent acid leaching is not required to remove iron, it has been found nevertheless advantageous to treat the clay with acid subsequent to the gas or vapor treatment, since more active catalysts are usually obtained in this manner.

The invention includes in addition to the preferred types of gaseous treating agents already named, other gases or vapors capable of converting iron components of the clay to simpler or more available form, such as phosgene, carbon disulfide, sulfurmonochloride, sulfonyl chloride, and sulfur vapors. As will be readily understood, the more active gases or vapors will require lower temperatures than less reactive reagents for comparable severity of treatment. For example a treatment with $CS_2$ may require temperatures in the order 1300° to 1400° F. to obtain effects comparable with $H_2S$ at 1200° F.

When the clay to be treated contains components or impurities reactive to form gases or vapors of the type described, the treating reagent may be accordingly selected to react with the said component or impurities, initially to form such gases or vapors in situ. For instance, if the clay contains sulfate ions or compounds, as it would if left in unwashed state after sulfuric acid treatment, the product may be then treated with hydrogen gas at the stated temperatures, forming hydrogen sulfide by the reaction with the sulfate, and in that manner accomplishing the effect of an $H_2S$ treatment. Since commercial acid activated clays such as bentonites contain residual sulfate, treatment with $H_2$ gas will be found convenient. Of course, if the residual $SO_4$ is insufficient to supply the required quantity of $H_2S$, additional sulfate may be added to the clay as by further treatment with sulfuric acid or a suitable sulfate.

As heretofore indicated the improved catalysts of the present invention cannot be obtained by continued or extensive acid treatment of the clay to reduce the iron content, since attempts to extract iron from the clay beyond a limiting maximum removability (evidently, at least in many cases, the point at which the readily available iron is depleted and only "isomorphous" iron remains), results in the accompanying removal of excessive quantities of aluminum compounds with reduction in catalytic activity. For instance a raw kaolin clay having an $Al_2O_3/Fe_2O_3$ ratio of about 44 was drastically treated with acid until the iron content was reduced to 0.27% $Fe_2O_3$, the product then contained only 2.3% $Al_2O_3$ and was practically inert as a catalyst. On the other hand, the present process provides for the selective removal of Fe compounds without corresponding excessive removal of active components such as alumina as will be seen from the following experiments:

(a) A kaolin clay having an original content of $Al_2O_3$ of 33% and an iron content corresponding to 1.4% $Fe_2O_3$ was treated at 1400° F. with $H_2S$ for 2 hours followed by an additional treatment with $Cl_2$ gas at 1400° F. for two hours, and washing at room temperature with 15% HCl. The treated product on analysis showed that the $Fe_2O_3$ content was only ¼ of that of the original product (0.35% $Fe_2O_3$) whereas the alumina content was only slightly reduced (30.22% $Al_2O_3$).

(b) An acid-activated clay having 18.% $Al_2O_3$ and 2.1% Fe₂O₃ treated with H₂S for two hours at 1400° F. and washed with 15% HCl at room temperature, on analysis showed an iron content corresponding to 0.1% Fe₂O₃ and 17.% Al₂O₃ in the residue.

(c) Another raw kaolin sample having an original content of 45.5% Al₂O₃ and 1.15% Fe₂O₃ after treatment with Cl₂ gas at 1400° F. for two hours showed on analysis .44% Fe₂O₃ and 45.8% of Al₂O₃.

Although in certain known processes of hydrocarbon conversion the catalyst can be employed in the form of finely divided particles or powders suspended in the charge stock, in other procedures as in fixed or moving catalyst bed operation, the catalyst is advantageously employed in the form of larger aggregates or agglomerated masses such as pellets, tablets, coarse granules, or the like. The present invention in its specific aspects is more particularly concerned with such larger aggregates, which preferably are formed immediately subsequent to the preliminary acid treatment, if practiced. These larger masses may be formed by compressing the dry finely divided particles or powders in a pelleting machine or by previously wetting the dry, treated or untreated clay with water or other inert liquid that will bind the small particles or powder into a cake which, after drying, can be broken up into granules or fragments of desired sizes, or the wet mix can be formed into more regular shapes by molding including casting, extruding or the like. The pellets or granules or other aggregates formed should be of a size that can be efficiently employed in catalytic processes. For instance, in some processes of hydrocarbon conversion, formed masses of 2 to 4 mm. cross section are preferred, whereas in this process and others such as employ a fluent suspension medium, catalysts of smaller size come also into consideration. The contact masses of the present invention, therefore, include formed masses or distinct granules as of the order retained on a 25 mesh screen, for instance masses having a cross section of about 1 mm.² If the catalyst is to be employed in the hydrocarbon treating process in the form of finer particles or powders, larger masses formed and treated in accordance with the above-described procedure can be subsequently ground or comminuted to the required fineness.

Although the clay catalyst prepared by the preferred procedure has already been subjected to a high temperature treatment, it is still preferred as a final step in the preparation of the catalyst, for use in hydrocarbon conversion processes, to subject the same to calcination at a temperature above 800° F. in air with or without added steam, or in steam alone.

In accordance with the present invention it is made possible not only to obtain catalysts from hitherto employed active clays, such as montmorillonites including catalytically activated bentonites and the like, but by the herein disclosed novel processes, the choice of raw clays for catalyst manufacture is materially extended and clays of impractical low activity or of the types which could not hitherto be beneficially employed as catalysts in cracking or reforming of hydrocarbons, now become available for efficient use in such processes. The present invention is therefore of particular importance with clays of the kaolinite type which have not previously found practical use as hydrocarbon cracking and reforming catalysts. These clays provide catalysts of exceptionally high apparent density and high heat capacity which can be utilized with important advantages in such processes.

In the use of the catalysts of the present invention no change in conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 3, and pressures may be employed from about atmospheric or slightly lower up to about 100 pounds per square inch, or even higher. Under these conditions the operating period, "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

As a general rule the active catalysts prepared from kaolin clays show desirable product distribution from the standpoint of lower molecular weight liquid hydrocarbons (C₅ and lighter) present in the gasoline fraction with substantial elimination of components of low gas gravity and while the octane rating of obtained gasoline is generally equivalent to that obtained by the use of conventional synthetic silica-alumina catalyst, the olefin content of the gasoline is usually somewhat higher in the case of the kaolin product. Because of the high density and accompanying high heat capacity of catalysts prepared from kaolin clay, as well as the higher heat stability, the throughput of charge can be stepped up, without introduction of damaging regeneration temperatures to obtain required coke burnoff in cycle, since the recited physical properties of the kaolin catalyst also lead to approximately even regeneration temperatures throughout the mass without pronounced localized zone-burning.

The term "kaolin" as herein employed has reference to raw clays or modified clays derived therefrom which clays in raw state contain kaolinite, dickite, nacrite, halloysite, or anauxite, as the principal clay mineral constituent present therein.

In the following examples notations of catalytic activity are expressed in terms of the standard test (CAT-A method) described in "Laboratory method for determining the activity of cracking catalysts," by J. Alexander and H. G. Shimp, page R537, National Petroleum News, August 2, 1944. In accordance with the method, a light gas oil is contacted with the catalyst under fixed cracking conditions and the activity of the catalyst is designated in terms of volume per cent of obtained gasoline; the weight per cent of wet gas, specific gravity of the gas, and weight per cent of carbonaceous deposits are also determined.

Example I

Commercial acid activated montmorillonite clay pellets ("Filtrol") were treated with an excess of $H_2S$ at 1400° F. for two hours under air-free conditions, the apparatus and contents having been previously swept with nitrogen. The pellets turned black as a result of the treatment. An equal volume of 15% HCl was added to the treated pellets after cooling and let stand at room temperature for two hours with frequent shaking. The temperature rose initially with rapid $H_2S$ evolution and the color of the pellets noticeably faded. The acid mixture was then heated for 30 minutes on a steam bath, the temperature rising to 140° F. After decanting, fresh 15% HCl was added to the batch in equal volume and let stand for 22.5 hours, then drained and washed several times with distilled water on a filter until chloride free. The total acid employed was about 35% on clay weight. After drying in an oven at 200° F. the pellets were calcined in air at 1050° F. for two hours. The pellets were now whiter in color than the original pellets. Tested for cracking activity on a light gas oil there was produced with the catalyst above prepared, 37.3% by volume of gasoline with 2.6% by weight of coke and 4.9% by weight of gas.

The X-ray diffraction patterns of the catalyst taken after calcination at temperature intervals from 1050° to 1650° F. indicate that the modified product prepared by the invention is generally less crystalline than the original acid activated clay. A comparison of the X-ray spectra of the two materials at several temperature levels in the designated range reveals variations in line patterns indicative of differences in atomic arrangement. The sample of the catalyst which had not received the gas treatment shows only progressive dimming of certain lines and other individual variations at 50° intervals in temperature, with an apparent transformation in crystalline structure between 1550° and 1600° F., and no amorphous condition over the range of temperatures studied. The catalyst of the Example approaches a form amorphous to the X-ray at 1550° F. and is completely so amorphous at 1600° F.; at 1560° F. there is the appearance of a new crystalline pattern indicative of a radical transformation in structure.

The characteristic temperature stability of catalysts of the present invention is significantly shown by the comparatively small change in pellet density and porosity after heat treatment at 1600 F. Whereas a typical commercial clay catalyst lost 50% of its porosity over the 1500–1600° F. temperature range, the catalyst of Example I showed no significant shrinkage and about 14% loss in porosity. The volume percent porosity in the table below was obtained by measuring the volume of water absorbed by a pellet of measured volume, substantially in accordance with the standard A. S. T. M. method (D468–42; Method A—Water absorption). The catalytic activity was well retained even after being subjected to the last stated high temperature, which temperature caused rapid decline in activity of a commercial catalyst from the same source clay. The results are shown by the following tabulation:

| | Heat Treating Catalyst Temperature, °F. | | | | | | | | Activity after 1,600° F. | | |
|---|---|---|---|---|---|---|---|---|---|---|---|
| | 1,400 | | 1,500 | | 1,550 | | 1,600 | | Gasoline, Vol. Per Cent | Coke, Wt. Per Cent | Gas, Wt. Per Cent |
| | p. d. | v. p. | p. d. | v. p. | p. d. | v. p. | p. d. | v. p. | | | |
| Commercial acid-activated clay | 1.08 | ------ | 1.12 | 53.6 | 1.4 | 35.8 | 1.59 | 26.8 | 11.2 | 0.4 | 1.2 |
| Catalyst of Example I | 1.01 | ------ | 1.02 | 58 | 1.05 | 55.0 | 1.14 | 50.0 | 35.3 | 1.4 | 4.1 | p. d.=pellet density; v. p.=volume per cent porosity.

The characteristic resistance of the new catalysts to sulfur and sulfides at high temperature is demonstrated by a comparison of the same with typical clay catalyst of about the same initial activity level (39).

| | Activity after sulfidation | | | |
|---|---|---|---|---|
| | Gasoline, Vol. Per Cent | Coke, Wt. Per Cent | Gas, Wt. Per Cent | Gas Grav. |
| (a) Commercial acid-activated clay (2.0% $Fe_2O_3$) | 22.2 | 8.0 | 8.9 | 0.58 |
| (b) Above clay after treatment (0.12% $Fe_2O_3$) | 38.7 | 2.5 | 7.9 | 1.55 |

The catalyst in (a) above was a typical commercial acid-activated clay while (b) was obtained by treating the same clay in accordance with Example I. The above sulfidation tests were made with $H_2S$ at 1000° F. for 2 hours. The results are indicative of the respective stability of the two catalysts and their behavior when employed for cracking or reforming of sulfur bearing charge stocks (compare Example V).

Example II

The tendency towards improved gasoline/gas and gasoline/coke ratios is in many instances evident when the iron content of the clay has been reduced to the order of about .8% $Fe_2O_3$. For example, the commercial acid activated montmorillonite treated as in Example I except that the $H_2S$ treatment was carried out at 1100° F. gave a catalyst which compared favorably with the original clay catalyst, as shown by the following tabulation:

| | Per Cent $Fe_2O_3$ | Vol. Per Cent Gasoline | Wt. Per Cent Coke | Wt. Per Cent Gas | Grav. Gas |
|---|---|---|---|---|---|
| Original acid-activated clay catalyst | 2.0 | 39.9 | 3.4 | 5.9 | 1.40 |
| Example II | .77 | 39.9 | 2.7 | 5.2 | 1.49 |

Example III

An unwashed commercial acid activated sub-bentonite clay in pellet form, ($SO_4=4.3\%$) was treated with hydrogen gas for two hours at 1400° F. in an apparatus freed from air. The product which turned greyish-black in color, was then leached with hydrochloric acid of 5% strength until all the dark color was removed, followed by washing and drying. On analysis it was found that the original iron content of over 2.% $Fe_2O_3$ had been reduced to .34% $Fe_2O_3$. The dried clay was then calcined in air at 1050° F. for 2 hours and employed in cracking of a light gas oil under above designated standard test conditions. There was obtained a yield of 32.9% by volume gasoline with the production of 1.9% by weight of coke and 5.6% by weight of gas of 1.34 gas gravity.

Example IV

A montmorillonite clay from Pontotoc, Mississippi ($Fe_2O_3=5.38\%$) was treated with sulfuric acid of 15% strength at room temperature over a period of eight hours employing an amount of acid (100% basis) equal to 60% of the dried clay. After washing and drying the product was formed into pellets of about 4 mm. cross-section.

(a) One portion of the pellets was calcined for 2 hours in air at 1050° F. Analysis of the product gave 2.88 $Fe_2O_3$.

(b) Another portion of the pellets was treated with $H_2S$ at 1400° F. for 2 hours. After cooling the pellets were leached with hydrochloric acid of 15% strength at room temperature for 24 hours, washed with water, dried and calcined in air at 1050° F. Analysis of the product gave 0.11% $Fe_2O_3$.

The activity of the catalysts produced in accordance with (a) and (b) above is compared in Example VIII.

Example V

The following example illustrates the striking degree of stability of the iron-freed clay catalysts towards high sulfur stock. The catalyst of Example I was employed in cracking Santa Maria gas oil, a highly corrosive stock of high sulfur content, under the following operating conditions: 1.5 volumes of oil per volume of catalyst per hour at a temperature of about 800° F. at atmospheric pressure, operating for 10 minutes with alternate regeneration. The following tabulation indicates the results obtained compared with commercial acid-activated clay catalyst used under the same conditions, the activity tests being on light East Texas gas oil.

| | Commercial acid-activated clay ($Fe_2O_3=2\%$) | | | Catalyst of Ex. I ($Fe_2O_3=.1\%$) | | |
|---|---|---|---|---|---|---|
| | Gasoline | Coke | Gas | Gasoline | Coke | Gas |
| Activity test on Fresh Catalyst (CAT-A) | 34.8 | 2.5 | 4.3 | 33.0 | 1.5 | 3.0 |
| Santa Maria Gas Oil: | | | | | | |
| 1st run | 32 | 10.8 | 5.5 | 28 | 6.5 | 3.3 |
| 4th run | 27 | 11.7 | 7.0 | 30 | 6.5 | 2.9 |
| 8th run | 24 | 13.7 | 6.6 | 30 | 6.4 | 3.1 |
| CAT-A Activity Test after Santa Maria Gas Oil Cracking | 18.3 | 4.9 | 5.8 | 35.0 | 1.8 | 3.5 |

Example VI

The raw clay treated in this example was a kaolin clay from Putnam County, Florida, known as "Edgar EPK" which gave the following analysis on a dry (105° C.) sand-free basis:

| | Per cent |
|---|---|
| Ignition loss | 12.9 |
| $SiO_2$ | [1] 46.6 |
| $Al_2O_3$ | [1] 38.8 |
| $Fe_2O_3$ | 1.0 |
| CaO | 0.44 |
| MgO | 0.23 |
| $TiO_2$ | 0.35 |
| Alk. metal (as oxide) | 0.52 |

[1] $SiO_2/Al_2O_3=1.2$.

The above clay was subjected in raw state to treatment with $H_2S$ in excess of 1500° F. for two hours. The clay became intensely black. After cooling, it was leached with an equal volume of 15% HCl over a period of 72 hours, the acid being changed 4 times. After decanting, washing and drying, the clay was calcined at 1050° F. for two hours in air. The analyzed iron content was .07% $Fe_2O_3$. The activity of the obtained catalyst is compared in the following table with the original raw clay and the same clay which received only an acid-treatment with 10% $H_2SO_4$ (.40 ratio to dry clay) for eight hours and calcined under same conditions as the compared products.

| Edgar Clay | Gasoline | Coke | Gas | Gas Grav. |
|---|---|---|---|---|
| Raw | 14.5 | 2.7 | 4.0 | 0.57 |
| Acid treated | 27.8 | 1.8 | 4.4 | 1.36 |
| $H_2S$ treated and acid leached | 40.8 | 3.1 | 10.2 | 1.46 |

Example VII

A sample of kaolin clay from Eccles property, Putnam County, Florida, was treated with an excess of chlorine gas for two hours at 1500° F. A large part of the iron was volatilized as ferric chloride. On analysis the original iron content of 1.4% $Fe_2O_3$ was found to have been reduced to .31%. The gasoline/gas and gasoline/coke ratio were decidedly improved, the coke production being substantially half of that obtained with clay from the same source calcined in air at the above temperature.

The same clay was brought to about 0.4 $Fe_2O_3$ by chlorine treatment at 1400° F. followed by acid leaching at room temperature. Tested on cracking of a light gas oil under standard conditions, there was obtained a yield of 34.7% by volume gasoline, whereas the original clay calcined in air showed a maximum activity of the order of 25–26% gasoline.

The original Eccles clay had the following analysis by weight (containing 10–20% sand): 65.8% $SiO_2$, 32.4% $Al_2O_3$, 1.4% $Fe_2O_3$, 0.23% CaO, .21% MgO, .69% $TiO_2$.

Example VIII

Other typical examples of increase in gasoline yields as well as lowered coke after removal of iron by the described methods are illustrated by the following comparisons:

|  | Gasoline | Coke | Gas |
|---|---|---|---|
| Commercial acid activated Milwhite clay (a Texas montmorillonite) $Fe_2O_3$ =5.1 | 42.4 | 6.4 | 12.1 |
| Above clay modified $Fe_2O_3$=.15% | 44.0 | 4.5 | 9.7 |
| Bentonite clay from Pontotoc, Miss., activated with $H_2SO_4$ (Example IVa) $Fe_2O_3$=2.88% | 34.1 | 4.1 | 7.3 |
| Above clay modified (Example IVb) $Fe_2O_3$=.11% | 41.4 | 3.4 | 8.9 |
| Raw kaolin clay from Huron, Indiana, $Fe_2O_3$=.95% | 13.2 | 7.4 | 6.8 |
| Above clay modified $Fe_2O_3$=.11% | 39.5 | 3.4 | 10.3 |

Obviously many modifications and variations of the invention as hereinbefore set forth may be made without departing from the spirit and scope thereof and therefore only such limitations should be imposed as are indicated in the appended claims.

Various aspects of the described invention are particularly claimed in our copending applications Serial Nos. 644,422, 644,423, and 644,424, all filed of even date with the present application, and in our continuation-in-part application Serial No. 681,426, filed July 3, 1946. Hydrocarbon conversion process employing catalytic contact masses of the present invention are particularly claimed in our copending applications Serial Nos. 644,425 and 644,426 also filed on the same date as the present application.

We claim as our invention:

1. The method of preparing catalytic contact masses from clay containing iron compounds which comprises treating such a clay at a temperature of at least 1200° F. and insufficient to effect substantial incipient fusion of the clay, with a chemical reagent in gaseous form reactive with iron to form acid soluble iron salts, cooling the treated clay, leaching the cooled clay to remove acid soluble iron salts, and calcining the residue.

2. The method of preparing stable clay catalysts which comprises the steps of forming finely divided clay into aggregate masses, treating the formed masses at elevated temperature with a gas reactive with iron compounds to form iron salts to thereby change iron compounds present in the clay to acid soluble iron salts, said elevated temperature being at least 1200° F. and below that at which substantial incipient fusion of the clay results, leaching out the formed iron salts with acid, washing, drying, and calcining the resulting dried clay residue.

3. The method of preparing active catalytic pellets from clay containing iron compounds which comprises forming said clay into pellets, subjecting the pellets to contact at a temperature in excess of 1200° F. and insufficient to effect substantial incipient fusion of the clay with a reactive gaseous treating agent capable of forming with the iron content of the clay acid soluble iron compounds, and dissolving out the so formed acid soluble iron compounds without substantial disintegration of the pellets.

4. The process in accordance with claim 3, wherein the dissolving of the acid soluble compounds is effected by treatment at room temperature with dilute mineral acid.

5. The method of preparing active catalysts from kaolin clays which comprises subjecting such a clay to treatment at 1500° F. for 2 hours with a gas reactive with iron to form iron salts, cooling the thus treated mass, leaching the cooled mass with dilute mineral acid, washing, drying, and calcining the mass.

6. The method of preparing active catalysts from kaolin clays which comprises forming therefrom bodies of discrete size and shape, subjecting the formed bodies to contact at elevated temperature in excess of 1200° F. and insufficient to effect substantial incipient fusion of the clay, with a reactive gaseous treating agent capable of forming with the iron content of the clay acid soluble iron compounds, and dissolving out the so formed acid soluble compounds without substantial disintegration of the formed bodies.

7. The method of preparing catalytic contact masses which comprises treating kaolin clays in the form of integral unit aggregates of discrete size with a chemically reactive gas at a temperature in the range of 1200° F. to 1650° F., to form acid soluble iron salts in situ, removing the salts so formed by acid leaching at low temperature so as to substantially maintain the form of the aggregates, and calcining the residue.

HUBERT A. SHABAKER.
GEORGE ALEXANDER MILLS.
RUTH C. DENISON.

REFERENCES CITED

The following references are of record in the file of this patent:

UNITED STATES PATENTS

| Number | Name | Date |
|---|---|---|
| 1,999,773 | McMichael | Apr. 30, 1935 |
| 2,030,967 | Hart | Feb. 18, 1936 |
| 2,322,674 | Thomas | June 22, 1943 |
| 2,388,302 | Weyl | Nov. 6, 1945 |
| 2,391,312 | Ewing et al. | Dec. 18, 1945 |
| 2,395,198 | Schulze | Feb. 19, 1946 |

OTHER REFERENCES

Hackh's Chemical Dictionary, 3rd ed., 1944, Blakiston, page 180. (Copy in Division 3).